US006983821B2

(12) United States Patent
Putt et al.

(10) Patent No.: US 6,983,821 B2
(45) Date of Patent: Jan. 10, 2006

(54) ACOUSTICAL PANEL HAVING A HONEYCOMB STRUCTURE AND METHOD OF MAKING THE SAME

(75) Inventors: Dean L. Putt, Lititz, PA (US); James L. Work, Lancaster, PA (US)

(73) Assignee: AWI Licensing Company, Wilmington, DE (US)

( * ) Notice: Subject to any disclaimer, the term of this patent is extended or adjusted under 35 U.S.C. 154(b) by 304 days.

(21) Appl. No.: 10/384,240

(22) Filed: Mar. 7, 2003

(65) Prior Publication Data

US 2003/0178250 A1 Sep. 25, 2003

Related U.S. Application Data

(63) Continuation-in-part of application No. 09/662,189, filed on Sep. 15, 2000, now abandoned.

(60) Provisional application No. 60/157,301, filed on Oct. 1, 1999, provisional application No. 60/157,269, filed on Oct. 1, 1999.

(51) Int. Cl.
*E04B 1/82* (2006.01)
*E04B 1/84* (2006.01)
*E04B 2/02* (2006.01)

(52) U.S. Cl. ............... 181/290; 181/294; 181/288; 52/144

(58) Field of Classification Search ........ 181/290–294, 181/286, 287, 288, 284; 428/116, 115; 493/966; 52/144, 145
See application file for complete search history.

(56) References Cited

U.S. PATENT DOCUMENTS 3,269,484 A * 8/1966 Lighter .................. 181/290
3,444,956 A    5/1969 Gaffney .................. 181/33
3,542,640 A   11/1970 Friedberg et al. ........... 162/101
3,770,560 A * 11/1973 Elder et al. ................ 181/286
3,819,388 A    6/1974 Cornwell .................... 106/86
3,871,952 A    3/1975 Robertson ................ 162/101
4,042,745 A    8/1977 Cornwell et al. .......... 428/310
4,104,077 A *  8/1978 Kobayashi et al. ......... 106/672
4,160,491 A *  7/1979 Matsumoto et al. ........ 181/284
4,330,589 A *  5/1982 Saito et al. ............ 428/312.4
4,347,912 A *  9/1982 Flocke et al. ............... 181/286
4,441,944 A    4/1984 Massey ....................... 156/71
4,488,932 A   12/1984 Eber et al. ..................... 162/9
4,551,384 A   11/1985 Aston et al. ............ 428/312.6
4,613,627 A    9/1986 Sherman et al. ............. 521/68
4,636,444 A    1/1987 Lombardozzi ............ 428/596
4,702,870 A   10/1987 Setterholm et al. .......... 264/87
4,899,498 A    2/1990 Grieb ........................ 52/144
5,085,929 A    2/1992 Bruce et al. ............. 428/309.9
5,250,578 A   10/1993 Cornwell .................... 521/83
5,277,762 A    1/1994 Felegi, Jr. et al. ......... 162/145
5,395,438 A    3/1995 Baig et al. .................. 106/214
5,612,385 A    3/1997 Ceaser et al. ................ 521/68
5,632,844 A    5/1997 Pate et al. .................. 156/290
5,720,851 A    2/1998 Reiner ....................... 162/101
5,728,510 A    3/1998 White ....................... 430/323

(Continued)

FOREIGN PATENT DOCUMENTS

EP    0 935 030 A1    8/1999

(Continued)

*Primary Examiner*—Edgardo San Martin

(57) ABSTRACT

An acoustically absorbent porous panel with a layer constructed from a substantially continuous open-celled porous material comprising a cured foamed cementitious material including a first face and a second face. The first face has a surface with a substantially planar profile and the second face has a substantially geometric pattern of depressions formed therein comprising approximately 50% to approximately 90% of the layer by volume.

22 Claims, 1 Drawing Sheet

U.S. PATENT DOCUMENTS

| | | | |
|---|---|---|---|
| 5,824,148 A | 10/1998 | Cornwell | 106/678 |
| 6,035,965 A * | 3/2000 | Fujiwara et al. | 181/293 |
| 6,334,280 B1 * | 1/2002 | Frappart et al. | 181/292 |
| 6,443,258 B1 * | 9/2002 | Putt et al. | 181/294 |
| 6,596,389 B1 * | 7/2003 | Hallett et al. | 428/317.9 |
| 6,613,424 B1 * | 9/2003 | Putt et al. | 428/312.4 |
| 6,743,830 B2 * | 6/2004 | Soane et al. | 521/83 |
| 6,780,356 B1 * | 8/2004 | Putt et al. | 264/42 |

FOREIGN PATENT DOCUMENTS

| | | |
|---|---|---|
| FR | 2 612 225 | 9/1988 |
| GB | 2 277 710 A | 11/1994 |
| WO | WO 99/63169 | 12/1999 |

* cited by examiner

ACOUSTICAL PANEL HAVING A
HONEYCOMB STRUCTURE AND METHOD
OF MAKING THE SAME

This application is a continuation-in-part of U.S. patent application Ser. No. 09/662,189, filed Sep. 15, 2000, now abandoned which claims the benefit of U.S. Provisional Application Nos. 60/157,269 and 60/157,301, each filed Oct. 1, 1999.

FIELD OF THE INVENTION

The present invention relates to the field of acoustic panels, and more particularly to acoustic panels having shaped surfaces for increasing acoustic absorbency.

BACKGROUND OF THE INVENTION

The manufacture of wet-laid acoustical panels includes a wet process having separate dilute water streams of fiber, fillers and binder which are then mixed together to create a slurry. The fibers are either organic or inorganic. Usually the fibers are inorganic for fire resistance. A typical binder is starch. Fillers may include newsprint (which also acts as a binder), clay, and perlite. A typical panel wet-forming process involves the successive steps of depositing a wet slurry onto a conveyor screen, draining water from the slurry through the screen including the use of suction for further water removal, compressing out additional water by means of a roll press and finally hot air drying the resulting wet panel as it is cast on the screen. Upon entering a drier, the wet panel typically has a 60 to 70% water content.

One of the most important aspects of a ceiling board is its sound absorption function. Artisans have employed many different techniques to increase sound absorption of acoustic panels, including apertures, fissuring, and striating. The relative noise reduction capability is expressed in terms of a Noise Reduction Coefficient (NRC). Historically, wet processed acoustical panels have not had a very high NRC as compared to dry processed ceiling boards, such as those made from fiberglass batts. However, there are many disadvantages associated with the use of fiberglass. Disadvantages include the cost of the fiberglass relative to natural fibers, complexity and costs associated with manufacturing fiberglass acoustical panels with organic binders, health and environmental concerns associated with the use of organic solvents and organic binders in the manufacture of fiberglass acoustic panels, and the lack of strength associated with acoustic panels having inner cores comprised of fiberglass batts.

In the manufacture of wet-processed acoustical panels, it is desirable for the sound absorbent composite materials to achieve an acceptable level of sound absorbency. This is usually done by reducing the density of the panel or increasing the panel thickness. Competing with the requirement of high acoustical absorbency is the need for a relatively stiff material to provide sufficient structural integrity and sufficient surface hardness to resist punctures and dents which may occur during the manufacture, transport, installation or use of the product. Additionally, a minimum thickness is also desirable to lower the material cost associated with the manufacture of acoustical panels from the acoustically absorbent material.

Unfortunately, wet-processed materials that exhibit sufficient stiffness and surface hardness are usually quite dense, have small and closed pores, and therefore do not display acceptable sound absorption characteristics. Furthermore, wet-processed materials with highly acoustical absorbent properties are much less dense due to increased porosity, and therefore do not exhibit sufficient stiffness and surface hardness properties required for acoustic panel applications. Additionally, since traditional wet-processing techniques require a vacuum drawn through a cross-section of the wet-laid material to remove water, a significant porosity size gradient arises through a cross-section of the panel, which further degrades the acoustic attenuation properties and strength of the finished panel.

With the foregoing problems in mind, it is an object of the present invention to create a novel acoustical panel having a high acoustic absorbency by altering the shape of a surface of the panel to achieve both good sound reduction and to retain excellent strength properties.

SUMMARY OF THE INVENTION

The present invention comprises an acoustically absorbent porous panel having a layer constructed from a substantially continuous open-celled porous, cured, foamed, cementitious material including a first face and a second face. The first face has a surface with a substantially planar profile and the second face has a substantially geometric pattern of depressions formed therein comprising approximately 50% to approximately 90% of the layer by volume.

The cured aqueous foamed cementitious material includes on a wet basis about 29% to about 74% by weight cement, about 17% to about 60% by weight water, about 0.05% to about 15% by weight fiber, and about 0.01% to about 10% by weight surfactant. The layer has a first face and a second face with the first face having a surface with a substantially planar profile and the second face having a substantially geometric pattern of depressions formed therein comprising approximately 50% to approximately 90% of the layer by volume.

A process for making an acoustically absorbent porous panel is also disclosed. The process comprises the steps of 1) combining on a wet basis about 29% to about 74% by weight cement, about 17% to about 60% by weight water, about 0.05% to about 15% by weight fiber, and about 0.01% to about 10% by weight surfactant to form an aqueous foamed cementitious mixture, 2) forming depressions within the aqueous foamed cementitious material and 3) curing the aqueous foamed cementitious material so that the depressions formed therein comprise approximately 50% to approximately 90% of the panel.

A further embodiment includes the acoustically absorbent porous panel comprising a first layer constructed from a substantially continuous open-celled, cured, foamed, cementitious material including a first face and a second face. The first face having a surface with a substantially planar profile and the second face having a substantially geometric pattern of depressions formed therein comprising approximately 50% to approximately 90% of the layer by volume. A scrim material is attached to the second face.

An additional embodiment includes an acoustically porous panel having a layer constructed from a substantially continuous open-celled porous material. The porous material includes a cured foamed cementitious material having a first face and a second face. The first face includes a substantially planar profile. Substantially planar can include various minor indentations, ridges or texturing. The second face includes a substantially geometric pattern of depressions formed within comprising 81% to about 90% of the layer by volume.

These and other features of the present invention will become apparent upon reading the following specification, when taken in conjunction with the accompanying drawings.

DETAILED DESCRIPTION OF THE INVENTION

Figure 1:
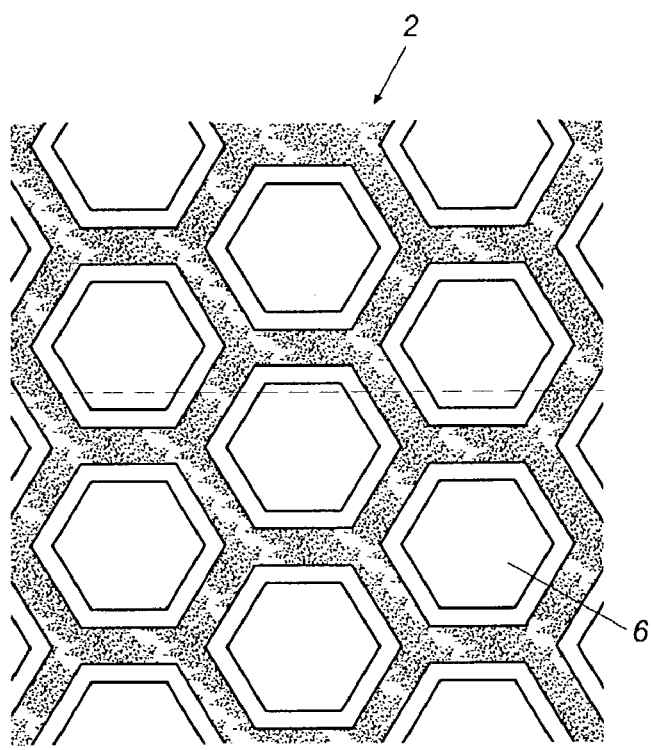
FIG. 1 is a top plan view of a surface of a layer within an acoustic panel according to the present invention.

The present invention relates to an acoustic panel including at least one layer for use in attenuating sound. This layer may be constructed from an open celled, porous material. The first layer includes a first face and second face disposed opposite the first face and an edge portion defining a periphery of the first and second faces, wherein the edge portion includes a thickness which separates the first and second faces to form a solid shape, typically a substantially rectangular solid shape.

The first face has a substantially planar profile and the second face includes a substantially geometric pattern of depressions molded into the second face. Each of the depressions creates void volume removed from a rectangular solid wherein a total volume of the acoustic panel is defined by the volume of the substantially rectangular solid shape minus the aggregate volume of the void volumes within the depressions. The layer within the acoustic panel resembles a honeycomb-type appearance. The depressions may be comprised of any shape. For example, the depressions may comprise a void volume having a semi-spherical shape, a cubic shape, an inverse pyramidal shape, or any other geometric solid shape that accomplishes the sound absorbency purposes of the acoustic panel.

In an embodiment, the open celled, porous material comprising one of the layers within the acoustic panel may comprise a density ranging from approximately 17 pounds per cubic foot to approximately 40 pounds per cubic foot. Additionally, the total void volume of a layer within the panel may comprise approximately 50% to approximately 90% of the total volume of the solid shape of a layer within the acoustic panel. The pore size distribution within the open celled, porous material may comprise approximately 45 microns to approximately 200 microns.

In an alternative embodiment of the present invention, a layer within the acoustic panel may include a scrim material adhered to the second surface covering the depressions. The scrim material may comprise any known fabric, however, Applicants have found that a non-woven fiberglass scrim having an air flow of approximately 100 cubic feet per minute to approximately 1,000 cubic feet per minute, as per ASTM D 737 test method, is suitable. In another embodiment of the present invention, the first planar face of the layer within the acoustic panel may include a backing material to further increase the acoustic absorbency of the overall panel.

The layer with a series of depressions may be comprised of any number of materials including a foamed cementitious or foamed gypsum material. The foamed cementitious material may include portland cement, sorrel cement, slag cement, fly ash cement or alumina cement. The foamed gypsum material may include calcium sulfate alpha hemihydrate or calcium sulfate beta hemihydrate. The foamed cement or foamed gypsum material may also include a surfactant to promote the foaming of the cement during mixing to entrap air and to create the open celled porous construction of the layer. Additionally, the foamed cement or foamed gypsum material may also include natural or synthetic fibers to further strengthen the cement. Such fibers may include inorganic fibers, or synthetic organic fibers comprised of, but not limited to, polyolefin, polyamide or polyester material. The surfactants may be anionic, nonionic, and amphoteric.

In an alternative embodiment, an acoustic panel may comprise two layers of the honeycombed material wherein the two layers are attached to one another such that faces having geometric depressions are facing one another, so as to create voids comprised of mirrored depressions to increase the acoustic absorbency of the panel.

FIG. 1 illustrates a top plan view of a patterned surface having a multitude of depressions 6 which form a surface of a layer within an acoustic panel 2, according to the present invention. Although the depressions 6 illustrated in FIG. 1 have a generally hexagonal cross section, the ordinarily skilled artisan will understand that the shape of the depressions may be semi-cylindrical, cubical, or any other shape which will effectively enhance the acoustic absorbency of a panel constructed in accordance with the present invention.

Figure 2:
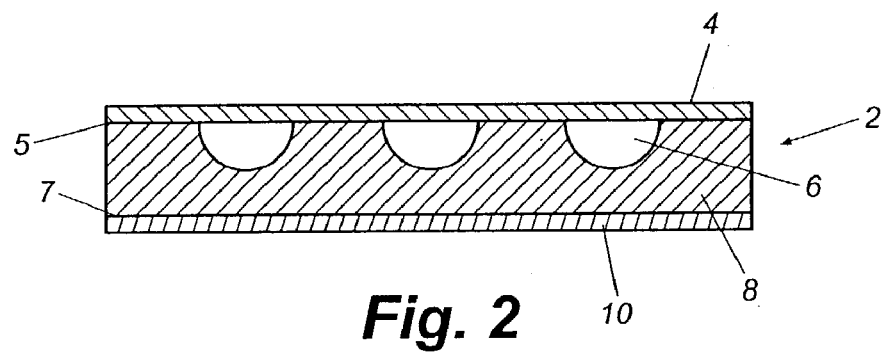
FIG. 2 is a cross sectional view of an acoustic panel according to the present invention, illustrating a scrim and a backing material adhered to either sides of the honeycombed layer within the panel.

FIG. 2 illustrates an alternative embodiment in which the acoustic panel 2 includes a scrim layer 4 adhered to surface 5, and a backing layer 10 adhered to surface 7. The layer 8, which includes the depressions 6, is formed from an open celled, porous material. One example of a material for use as a layer 8 is foamed gypsum, more specifically, alpha or beta gypsum, or mixtures thereof. The composition may include fibrous materials to add strength. Among fibrous materials suitable for use in layer 8 are synthetic organic fibers such as polyolefins, polyamids and polyesters.

The layer 8 can be constructed from a foamed material. A surfactant typically facilitates development of a foam structure and matrix around which the cementitious material solidifies. Surfactants may include anionic, nonionic and amphoteric surfactants.

Another example of a material which may comprise the layer 8 of the acoustic panel 2 is a foamed cement. Examples of cement which may be used include portland cement, gypsum cement, sorrel cement, slag cement, fly ash cement, alumina cement and mixtures of any of the above referenced cements. The cement mixture may also include inorganic fibrous materials such as wollastonite, a fibrous form of calcium silicate. Other fibers include synthetic organic fibers such as polyolefin, polyamide and polyester materials. Since the foamed cement must encapsulate air while it is being mixed before inserting into a mold, it has been found that anionic, nonionic, and amphoteric surfactants are suitable in creating a cementitious foam.

To enhance the acoustic absorbency of the panel 2, a scrim 4 may be adhered to surface 5 to cover the depressions or voids 6. Although any scrim material is acceptable, Applicants have found that a non-woven fiberglass from approximately 0.003 to 0.030 inches thick, having an air flow of approximately 100 cubic feet per minute to approximately 1,000 cubic feet per minute is acceptable.

Additionally, Applicants have found that the addition of a backing material 10 adhered to a second face 7 of the present invention, also enhances the acoustic absorbency of the invention. The backing may be additional foamed material having a thickness of approximately 0.25 to approximately 0.75 inches. An additional layer may be comprised of any acoustical material, but Applicants have found that a foamed cementitious composition works best.

In general, the porous, open celled material that makes up the layer 8 within the acoustic panel 2 of FIG. 2 should have a pore size of approximately 40 to 200 microns. Additionally, where a foamed cement is utilized as a material for the layer 8 within the acoustic panel 2, the pores should comprise about 75 to 95 volume percent of the panel 8. Additionally, the total volume of the depressions 6 should comprise approximately 50% to approximately 90% of the total volume of layer 8 without depressions 6. Applicants have also found that a depth of an acoustical cell of approximately ⅛ to 2 inches is acceptable. Additionally, the density of the cementitious or foamed gypsum material used for the layer 8 should have a density of approximately 17 pounds per cubic foot to approximately 40 pounds per cubic foot. Finally, it has been found that a backing thickness of approximately 0.5 inches to approximately 0.75 inches is suitable for the above referenced backing 10 within panel 2.

Figure 3:
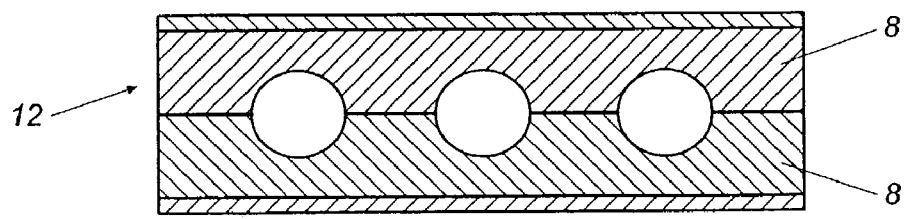
FIG. 3 illustrates an alternative embodiment of the present invention, comprising at least two honeycombed layers.

Also envisioned is an alternative panel 12, shown in FIG. 3, comprised of two layers 8 having depressions 6 that face one another to create depressions within the acoustic panel 12. The panel may be comprised of the foamed gypsum or foamed cement material including any of the ingredients as envisioned in the present invention. Additionally, a backing material layer 10 may be applied to the smooth outer surfaces of panel 12, if acoustic absorbency parameters warrant the addition of such backing material.

The following examples below are merely various experiments used to validate the above referenced invention and are in no way intended to limit the present invention. The Formulation Table set forth below illustrates the various formulations 1 through 7 for the examples that follow. The Formulation Table below expresses each constituent as a percentage by weight. In each of the examples that follow, density is expressed as lbs./cu. ft.

FORMULATION TABLE

| Formulation | 1 | 2 | 3 | 4 | 5 | 6 | 7 |
|---|---|---|---|---|---|---|---|
| Gypsum | 65.5 | 63.1 | 61.8 | 60.6 | 58.4 | 56.4 | 54.5 |
| Water | 32.8 | 35.4 | 36.7 | 37.9 | 40.1 | 42.2 | 44.2 |
| Surfactant | 1.0 | 0.9 | 0.9 | 0.9 | 0.9 | 0.8 | 0.8 |
| Fiber | 0.7 | 0.6 | 0.6 | 0.6 | 0.6 | 0.6 | 0.5 |
| Dry density | 50 | 48 | 40 | 30 | 25 | 20 | 17 |

In the first evaluation of Example 1, Applicants compared acoustics of panels having a single cavity of fixed depth and varied the open area by increasing the diameter of the cavity. The amount of open area is reported as a percentage of total surface area of the layer of gypsum or cementitious foam. For each of the measurements, the face of the layer having the various depressions or cavities was enclosed with a fiberglass scrim as disclosed above. A fiberglass scrim of 0.020 inches thick was used for this particular example. In Example 1, Applicants measured the Noise Reduction Coefficient as a function of increasing front cavity area percentage. In Examples 1, 2 and 4 through 6 Applicants determined NRC per ASTM E1050-90, C634, C384 and E548 specifications using an impedance tube device. The column entitled "Scrim" notes that the sound was directed at the scrim, and the column entitled "Back" notes that the sound was directed at the planar surface of the panel opposite the scrim.

EXAMPLE 1

Formulation 4

| Front Cavity Percentage | NRC (Scrim) | NRC (Back) |
|---|---|---|
| 0% | 0.66 | 0.70 |
| 10% | 0.71 | 0.72 |
| 17% | 0.67 | 0.73 |
| 26% | 0.69 | 0.69 |
| 37% | 0.68 | 0.68 |
| 50% | 0.66 | 0.70 |
| 70% | 0.64 | 0.71 |

Applicants believe that the data produced from Example 1 reveals little variation in acoustical values as related to the diameter or void volume of the cavity.

In Example 2, Applicants evaluated the overall effect of the thickness of the backing with regard to acoustic performance. In this Example, a ⅜ inch thick layer 8, having the various depressions 6, therein integral with the foamed, cementitious composition, having a thickness of 0 to ⅜ inch as measured from the bottom of the cell depressions to the planar first surface was varied. A fiberglass scrim was applied over the depressions on a first surface of layer 8. NRC values in the table below for Example 2 note whether the sound was directed at the scrim or at the planar backside of the gypsum foam. The data reveal some dependence of NRC on the direction from which the sound approaches the foamed material within the layer 8. Applicants have concluded that the scrim covered, honeycombed face is more effective as an acoustic absorber than the planar backside when oriented toward the incoming sound.

EXAMPLE 2

Formulation 4

| Backing Thickness | Scrim | Back |
|---|---|---|
| 0 | 1.00 | 1.00 |
| ¹⁄₁₆ | 0.83 | 0.84 |
| ⅛ | 0.78 | 0.78 |
| ¼ | 0.79 | 0.70 |
| ⅜ | 0.72 | 0.59 |

Example 3 below illustrates an additional test of the same material of Formulation 4 to confirm that the scrim covered honeycombed face is more acoustical than the continuous back face. For Example 3, Applicants utilized a reverberation room test that conforms to the following standards: ASTM C423-90a, E 122, E 548, E 795; ANSI S1.6, S1.26, S.1.11; and ISO R 354-1963. Applicants also conducted an airflow test that conforms to ASTM D 737 standards. Additionally, Applicants conducted Sound Transmission Coefficient (STC) tests having results determined by an insertion loss as set forth in ASTM E 90.

EXAMPLE 3

Formulation 4

| Honeycomb | NRC (reverb room) | | Air Flow (ohms) | | STC | |
|---|---|---|---|---|---|---|
| | Scrim | Back | Scrim | Back | Scrim | Back |
| 30 lb/cuft | 0.48 | 0.38 | 2 | 16 | 34 | 35 |

Another property for examination was the density of the gypsum foam used for the layer 8. In Example 4, Applicants controlled the density to some extent by varying the amount of water added to the mixture. A greater weight percentage of water results in a lower density foam, when the foam is dried. All samples of the layer 8 were ⅝ of an inch thick, without depression 6. The relationship between the density and acoustical properties is most significant as demonstrated in the table for Example 4 below. The greatest acoustical absorbency occurs between the density ranges from 17 to 25 pounds per cubic feet.

EXAMPLE 4

| Formulation | Density | NRC |
|---|---|---|
| 7 | 17 lb/cuft | 1.00 |
| 6 | 20 lb/cuft | 0.80 |
| 5 | 25 lb/cuft | 0.48 |
| 4 | 30 lb/cuft | 0.36 |
| 2 | 48 lb/cuft | 0.29 |
| 1 | 50 lb/cuft | 0.24 |

The table of Example 5 below illustrates yet another example of the effect of density on acoustics. In Example 5, Applicants compared samples of various thickness and density. Applicants found that the Noise Reduction Coefficient decreased markedly with an increase in density.

EXAMPLE 5

Formulations 1 & 3

| Density | Thickness (in.) | NRC |
|---|---|---|
| 40 (lb/cuft) Formulation 3 | ½ | 0.41 |
| 40 (lb/cuft) Formulation 3 | ⅝ | 0.43 |
| 50 (lb/cuft) Formulation 1 | ½ | 0.24 |
| 50 (lb/cubft) Formulation 1 | ⅝ | 0.24 |

Next, Applicants made three layers 8, each having a density of 28 pounds per cubic foot and measured the Noise Reduction Coefficient with increasing cell depth within a ⅝ panel.

EXAMPLE 6

Formulation 1

| Cell Depth | NRC |
|---|---|
| 0.125 in. | 0.57 |
| 0.250 in. | 0.75 |
| 0.375 in. | 0.79 |

The data reveals that the depth of the cell has a significant effect in determining the acoustical properties of the structure. The width of the cell, however, as presented in Example 1 has very little significance.

Finally, the Applicants demonstrated a relationship between density and pore size distribution in these structures. Pore size distribution was determined using a Micromeritics AutoPore II 9220 Mercury Porosimeter and are tabled in Example 7. Pore sizes outside of those noted are not measurable by this equipment.

EXAMPLE 7

| Density | Average pore size | Pore size distribution |
|---|---|---|
| 17 lb/cuft Formulation 7 | 10 microns | 1–10 microns, 20%; 42–250 microns, 70% |
| 25 lb/cuft Formulation 5 | 8 microns | 1–10 microns, 20%; 20–200 microns, 70% |
| 40 lb/cuft Formulation 3 | 4 microns | 1–10 microns, 40%; 11–42 microns, 50% |

As illustrated in the table of Example 7, if one were to make a line graph of pore size distribution and compare the results to the table of Example 4, which illustrates acoustics vs. density, a higher NRC occurs when the pore size distribution of the foamed cementitious composite is in the range of 45–200 microns. Applicants therefore conclude from the above-referenced data that acoustic properties change as a function of the pore size distribution. Applicants believe that the control of pore size distribution is a unique manner of controlling the acoustic absorbency of the inventive foamed material.

The cementitious material is relatively resistant to moisture. This can be quantified as a value determined from a sag test. The following are approximate four-cycle sag test ranges for various embodiments. Each cycle consists of subjecting the 2 ft by 2 ft sample to 17 hours at 82° F. and 90% RH followed by 6 hours at 82° F. and 35% RH. In traditional wet fiberboards, at 90% RH there is typically a resulting sag of less than 0.15 inches. In one embodiment, at 90% RH there is typically a resulting sag of less than 0.1 inches. In another embodiment, at 90% RH there is typically a resulting sag of less than 0.05 inches.

As discussed above, the inventive honeycombed structure may also be comprised of a foamed cement or gypsum. The formulation of the foamed cementitious material in uncured, wet weight percentages may include about 53% to about 68% cement; about 17% to about 48% water; about 0.05% to about 5% fibers; and about 0.01% to about 10% surfactant. The fibers may be synthetic organic fibers, such as those formed from polyesters. Other formulations for the foamed cementitious material in uncured, wet weight percentages may include about 54% to about 61% cement; about 32% to about 44% water; about 0.1% to about 3% fibers; and about 0.5% to about 5% surfactant. Additionally, the foamed cementitious material in uncured, wet weight percentages may include about 56% to about 61% cement; about 32% to about 42% water; about 0.28% to about 1.3% fibers; and about 0.7% to about 2% surfactant.

Furthermore, the formulation in weight percentages may include approximately 54.5% to approximately 65.5% gypsum or cement, 32.8% to approximately 44.2% water, approximately 0.8% to approximately 1.0% surfactant, and approximately 0.01% to approximately 0.7% fiber. In making the above-mentioned composition, one method may involve combining all dry ingredients for uniform dispersion of the polyester fiber (if fiber is used, as it is not necessary to the present invention, but increases panel strength). In this method the process may involve the preparation a 40% surfactant solution of disodium laureth sulfosuccinate and then the addition of the surfactant solution to the dry mix to wet and combine all ingredients. The process may then include the step of whipping the fiber, cement, and surfactant mixture at a high speed with a wire whisk for approximately one to three minutes until the cement/gypsum (-fiber) mix foams. The process may also include the initiation of a secondary, low shear mixing operation to disperse the fibers (if used) which may ball up during the high speed mixing cycle. In the secondary low shear mixing operations, the process may utilize a low shear paddle mixer which is similar to those used with spackling and plaster mixing to disperse the clumps of fiber. The process may involve mixing the foam cement at a low speed until just before the foam begins to collapse. The process may then involve applying the foamed material to a honeycomb mold for curing.

The resulting foamed material produces a cementitious composition with a density between about 10 lbs/ft$^3$ and about 40 lbs/ft$^3$. In an alternative embodiment the panel can have a density between about 15 lbs/ft$^3$ and about 35 lbs/ft$^3$ or between about 20 lbs/ft$^3$ and about 30 lbs/ft.

One specific step in the inventive process also includes details in the preparation of the surfactant solution. More specifically, Applicants have found that the maximum foaming of a portland cement or gypsum mixture occurs when the surfactant solution is prepared between about 68 degrees Fahrenheit and about 100 degrees Fahrenheit, with the preferred temperature of approximately 90 degrees Fahrenheit. Applicants have also determined that a deviation in water temperature from the optimum temperature range will increase the density of the foam by a factor of about 5 pounds per cubic foot for every 10 degrees Fahrenheit deviation. Thus, it is advantageous to keep the surfactant water solution temperature at approximately 90 degrees Fahrenheit.

While preferred embodiments have been illustrated and described above, it is recognized that variations may be made with respect to features and components of the invention. Therefore, while the invention has been disclosed in preferred forms only, it will be obvious to those skilled in the art that many additions, deletions and modifications can be made therein without departing from the spirit and scope of this invention, and that no undue limits should be imposed thereon except as set forth in the following claims. For example, it is contemplated that many types of materials may comprise the core of the inventive panel, as described above. Additionally, the present invention is not limited to ceiling tiles, but may include wall structures, exterior coverings and tackable surfaces.

What is claimed is:

1. An acoustically absorbent porous panel comprising:
    a layer constructed from a substantially continuous open-celled porous material comprising a cured foamed cementitious material having a first face and a second face;
    the first face having a surface with a substantially planar profile; and
    the second face having a substantially geometric pattern of depressions formed therein comprising 81% to approximately 90% of the layer by volume,
    wherein the foamed cementitious material is formed from an aerated aqueous foam slurry comprised of:
    about 29% to about 74% by weight of cement;
    about 17% to about 60% by weight of water;
    about 0.05% to about 15% by weight of synthetic organic fibers; and
    about 0.01% to about 10% by weight of surfactant.

2. The acoustically absorbent porous panel of claim 1, wherein the aerated aqueous foam slurry comprises about 29% to about 68% by weight of cement.

3. The acoustically absorbent porous panel of claim 1, wherein the layer has a noise reduction coefficient of at least 0.70.

4. The acoustically absorbent porous panel of claim 1, further including a scrim material attached to the second face.

5. An acoustically absorbent porous panel comprising:
    a layer constructed from a substantially continuous open-celled porous material comprising a cured foamed cementitious material having a first face and a second face, the first face having a surface with a substantially planar profile and the second face having a substantially geometric pattern of depressions formed therein comprising 81% to approximately 90% of the layer by volume; and
    a scrim material attached to the second face, wherein the scrim is formed from a non-woven fiberglass material having an air flow of approximately 100 cubic feet per minute to approximately 1000 cubic feet per minute.

6. The acoustically absorbent porous panel of claim 5, wherein the non-woven fiberglass material has a thickness between about 0.003 inches and about 0.03 inches.

7. An acoustically absorbent porous panel comprising:
    a layer constructed from a substantially continuous open-celled porous material comprising a cured foamed cementitious material having a first face and a second face;
    the first face having a surface with a substantially planar profile; and
    the second face having a substantially geometric pattern of depressions formed therein comprising 81% to approximately 90% of the layer by volume,
    wherein the layer has interconnecting pores formed therein.

8. The acoustically absorbent porous panel of claim 7, wherein the interconnecting pores have an average size distribution of from about 45 $\mu$m to about 200 $\mu$m.

9. The acoustically absorbent porous panel of claim 1, wherein the depressions are at least about 0.125 inches deep.

10. The acoustically absorbent porous panel of claim 1, further comprising a backing material adhered to the first face.

11. The acoustically absorbent porous panel of claim 1, wherein the geometric pattern of depressions has honeycomb structure.

12. An acoustically porous panel comprising:
a layer constructed from a substantially continuous open-celled porous material comprising a cured foamed cementitious material having a first face and a second face;
the first face having a surface with a substantially planar profile; and
the second face having a substantially geometric pattern of depressions formed therein comprising approximately 50% to approximately 90% of the layer by volume,
wherein the foamed cementitious material is formed from an aerated aqueous foam slurry comprised of:
about 53% to about 68% by weight of cement;
about 17% to about 48% by weight of water;
about 0.05% to about 5% by weight of synthetic organic fibers; and
about 0.01% to about 10% by weight of surfactant.

13. The acoustically absorbent porous panel of claim 12, wherein the foamed cementitious material is formed from an aerated aqueous foam slurry comprised of:
about 54% to about 61% by weight of cement;
about 32% to about 44% by weight of water;
about 0.1% to about 3% by weight synthetic organic fibers; and
about 0.5% to about 5% by weight surfactant.

14. The acoustically absorbent porous panel of claim 12, wherein the cement is selected from the group consisting of gypsum cement, portland cement, sorrel cement, slag cement, fly ash cement, calcium alumina cement and mixtures thereof.

15. The acoustically absorbent porous panel of claim 14, wherein the gypsum cement is selected from the group consisting of calcium sulfate alpha hemihydrate and calcium sulfate beta hemihydrate.

16. The acoustically absorbent porous panel of claim 12, wherein the layer as a density between about 10 lbs/ft$^3$ and about 40 lbs/ft$^3$.

17. The acoustically absorbent porous panel of claim 12, wherein the fibers are synthetic organic fibers selected from the group consisting of polyester, polyamide, and polyolefin.

18. The acoustically absorbent porous panel of claim 12, wherein the cementitious material comprises about 53% to about 66% by weight cement.

19. The acoustically absorbent porous panel of claim 12, further comprising a scrim material attached to the second face.

20. The acoustically absorbent porous panel of claim 19, wherein the scrim is formed from a non-woven fiberglass material having an air flow of approximately 100 cubic feet per minute to approximately 1000 cubic feet per minute.

21. The acoustically absorbent porous panel of claim 12, wherein the geometric pattern of depressions has honeycomb structure.

22. The acoustically absorbent porous panel of claim 1, wherein the foamed cementitious material is formed from an aerated aqueous foam slurry comprised of:
about 53% to about 68% by weight of cement;
about 17% to about 48% by weight of water;
about 0.05% to about 5% by weight of synthetic organic fibers; and
about 0.01% to about 10% by weight of surfactant.

* * * * *